US 6,640,026 B2

United States Patent
Tsuritani et al.

(10) Patent No.: US 6,640,026 B2
(45) Date of Patent: Oct. 28, 2003

(54) OPTICAL MULTIPLEXER AND DEMULTIPLEXER

(75) Inventors: Takehiro Tsuritani, Kamifukuoka (JP); Masatoshi Suzuki, Kamifukuoka (JP)

(73) Assignee: KDD Submarine Cable Systems Inc., Tokyo (JP)

( * ) Notice: Subject to any disclaimer, the term of this patent is extended or adjusted under 35 U.S.C. 154(b) by 96 days.

(21) Appl. No.: 09/956,573

(22) Filed: Sep. 18, 2001

(65) Prior Publication Data

US 2002/0034359 A1 Mar. 21, 2002

(30) Foreign Application Priority Data

Sep. 18, 2000 (JP) .................................. 2000-281927

(51) Int. Cl.[7] .............................................. G02B 6/28
(52) U.S. Cl. ..................................................... 385/24
(58) Field of Search ............................ 385/24, 42, 46, 385/37, 48; 359/115, 124, 130

(56) References Cited

PUBLICATIONS

H. Arai, et al., "Improvement of Isolation of Interleave Multi/Demultiplexers using three–stage MZIs", Proceedings of The 2000 IEICE General Conference, C–3–85, Japan, 2000.

H. Arai, et al., "Reduction of Chromatic Dispersion of Wavelength Interleaver using three–stage MZIs", Preceedings of The 2000 Electronics Society Conference, C–3–15, Japan, 2000.

Primary Examiner—Javaid H. Nasri
(74) Attorney, Agent, or Firm—Christie, Parker & Hale, LLP (57) ABSTRACT

To realize an optical demultiplexer with a constant chromatic dispersion value, an optical signal of wavelength ($\lambda 1$) enters a port (A) of an optical circulator (10), and an optical signal of wavelength ($\lambda 2$) enters a port (A) of an optical circulator (12). A port (B) of the optical circulator (10) connects to a port (X0) of an interleaved optical filter (14), and a port (B) of the optical circulator (12) connects to a port (X1) of the optical filter (14). A port (Y0) of the optical filter (14) connects to a port (Y1) of the optical filter (14) through an optical isolator (16). The optical isolator (16) allows the optical propagation from the port (Y0) to the port (Y1) of the optical filter (14) and refuses the optical propagation from the port (Y1) to the port (Y0). An optical coupler (18) combines the input lights of the input ports (X0 and X1) from ports (C) of the optical circulators (10 and 12) and outputs from the output port (Y0). The optical filter (14) transmits wavelength ($\lambda 1$) in the straight propagation between the ports (X0, Y0) and between the ports (X1, Y1) and transmits wavelength ($\lambda 2$) in the cross propagation between the ports (X0, Y1) and between the ports (X1, Y0).

12 Claims, 5 Drawing Sheets

OPTICAL MULTIPLEXER AND DEMULTIPLEXER

CROSS-REFERENCE TO RELATED APPLICATION

This application claims priority of Japanese Patent application number 2000-281927, filed Sep. 18, 2000.

FIELD OF THE INVENTION

This invention relates to an optical multiplexer to multiplex optical signals having different wavelengths and an optical demultiplexer to demultiplex wavelength multiplexed optical signals.

BACKGROUND OF THE INVENTION

To realize high-density wavelength multiplexed optical transmission, an optical multiplexer/demultiplexer to multiplex optical signals having different wavelengths and to demultiplex wavelength multiplexed optical signals into individual wavelengths in a low crosstalk. As one means, a combination of an interleaved optical filter to distribute a plurality of optical signals having wavelengths at constant interval into two ports and an arrayed waveguide grating has been studied.

Figure 3:
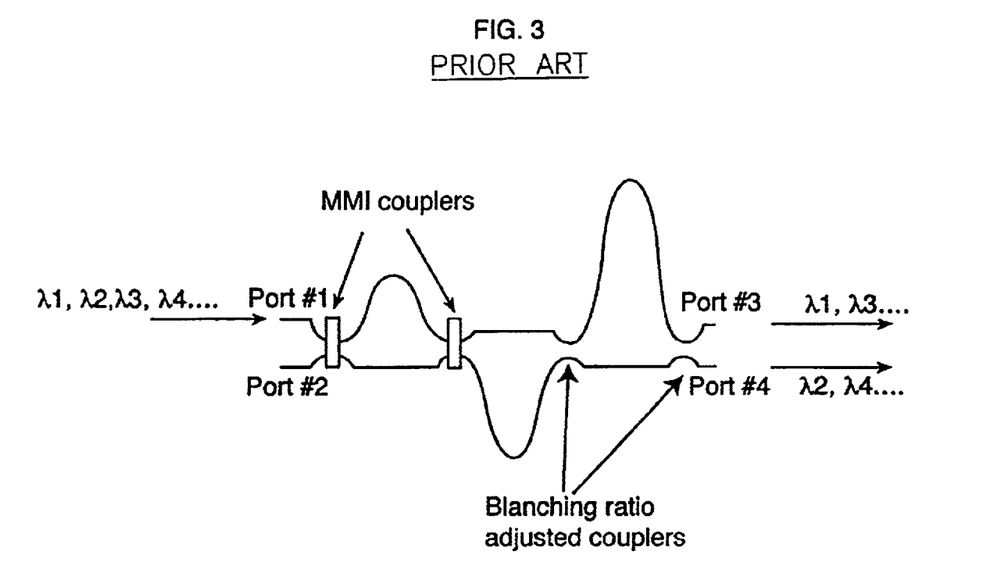
FIG. 3 shows a configuration of an interleaved optical filter.
Figure 4:
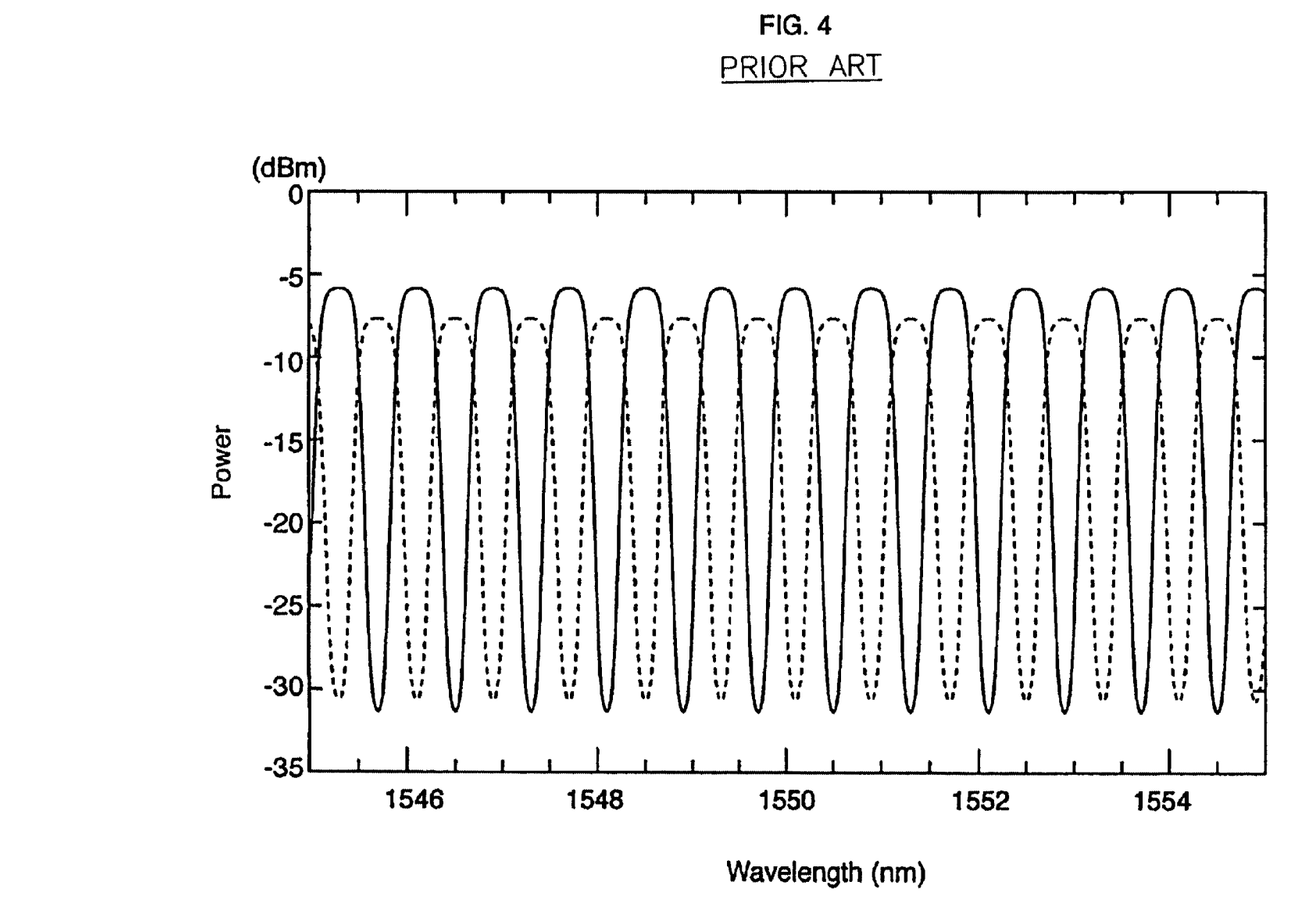
FIG. 4 is a diagram showing transmission characteristics of an interleaved optical filter.

As shown in FIG. 3, an interleaved optical filter consists of multi-stage Mach-Zehnder interferometers connected in serial and has periodic bandpass characteristics and relatively steep loss wavelength characteristics (See H. Arai et al., "Improvement of Isolation of Interleave Multi/Demultiplexers using three-stage MZIs", Proceedings of The 2000 IEICE General Conference, C-3-85, JAPAN, 2000). FIG. 4 is a schematic diagram showing insertion loss wavelength characteristics of an interleaved optical filter to reduce interval of 100 GHz of wavelength multiplexed optical signals into interval of 50 GHz.

Figure 5:
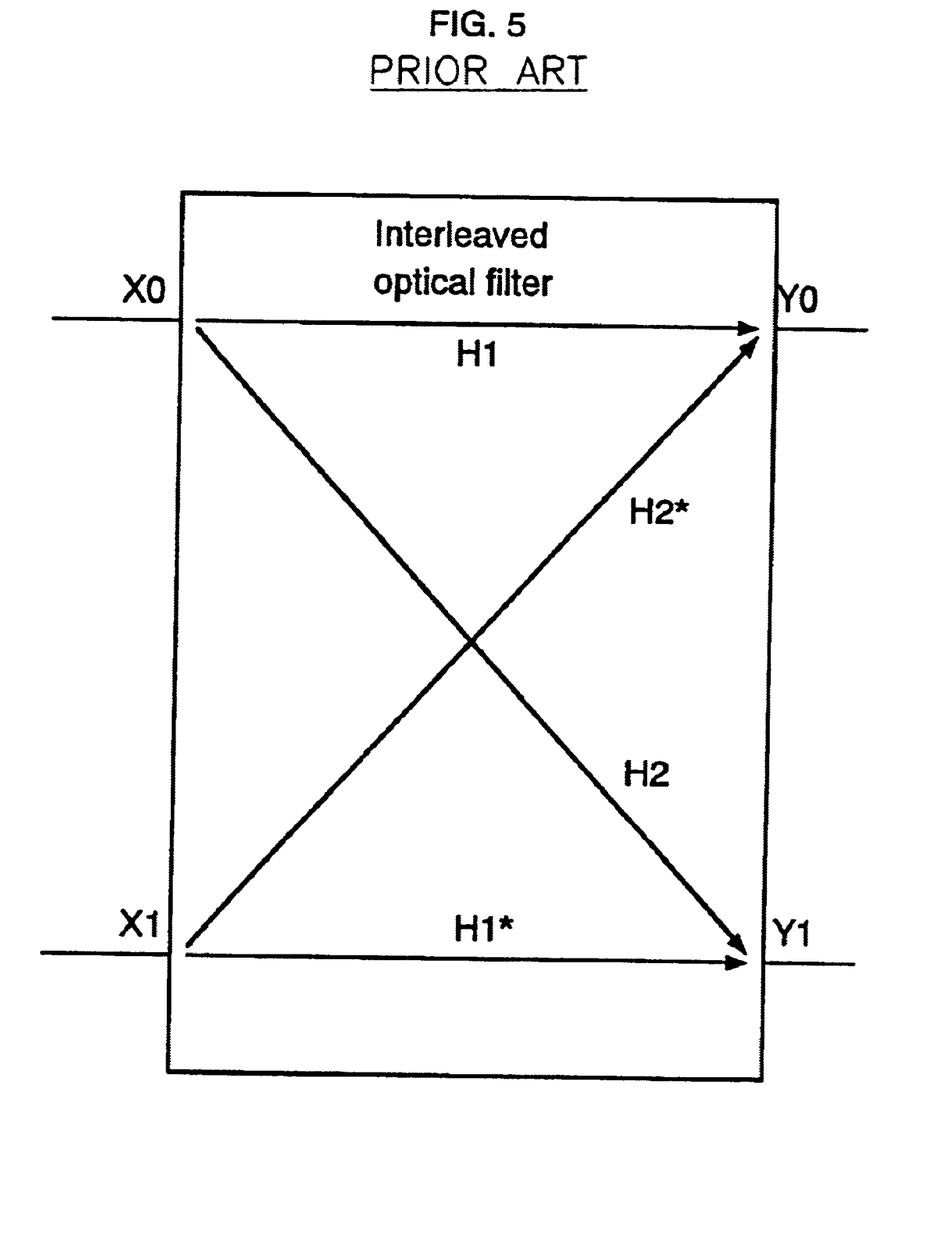
FIG. 5 is a diagram showing transfer functions H1, H1*, H2 and H2* of an interleaved optical filter.

However, when the wavelength interval become as narrow as 0.3 nm, it becomes difficult to sufficiently suppress the crosstalk. In addition, an optical filter generally has chromatic dispersion characteristics due to a production error etc., and this causes waveform deterioration owing to frequency chirping. As shown in FIG. 5, assuming that the transfer function between ports X0 and Y0 of an interleaved optical filter is H1, the transfer function between ports X1 and Y1 is H1*, the transfer function between port X0 and Y1 is H2, and the transfer function between ports X1 and Y0 is H2*, those transfer functions show chromatic dispersion characteristics and transmission factor characteristics as shown in FIG. 6.

Figure 6:
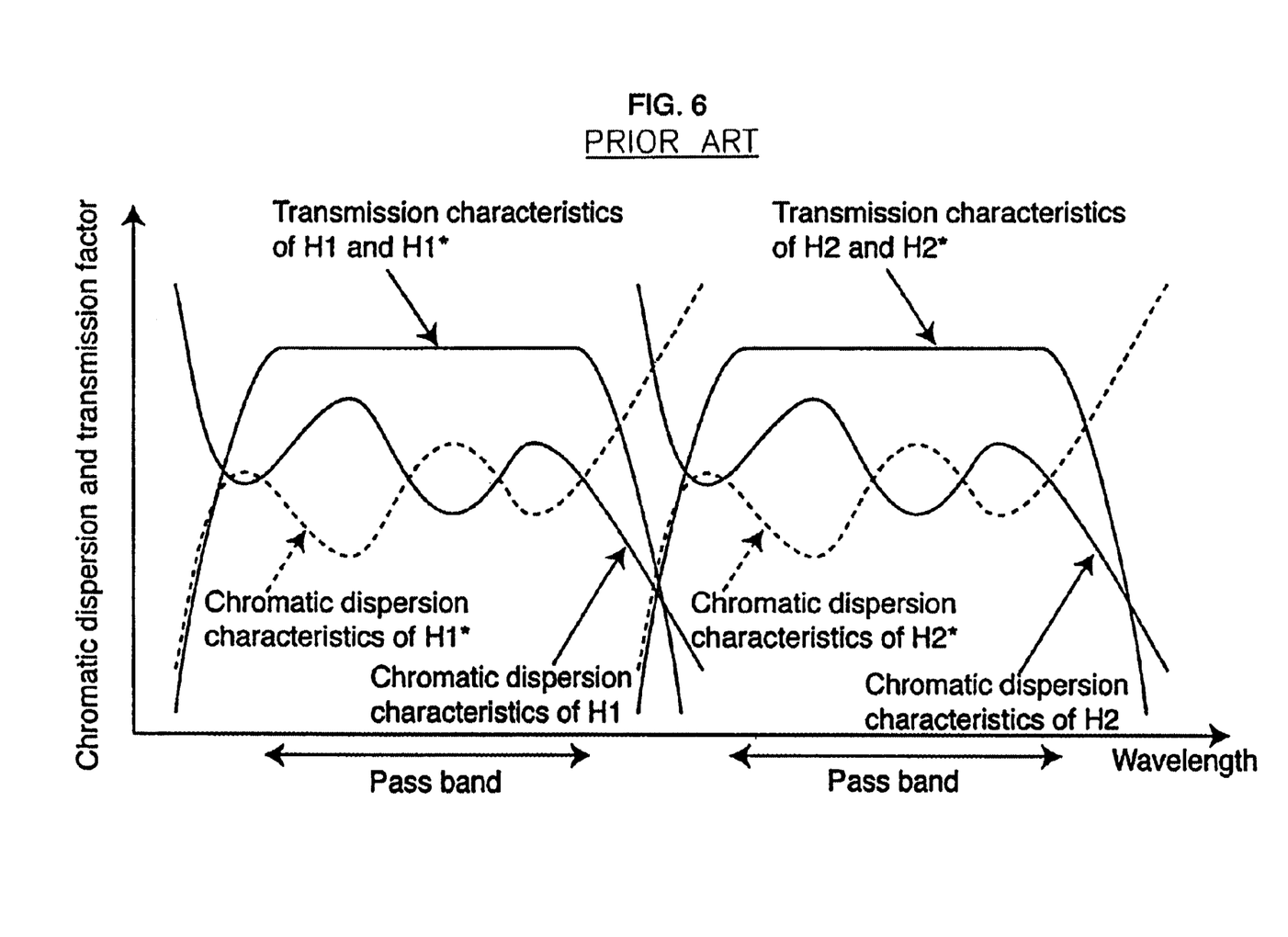
FIG. 6 depicts chromatic dispersion characteristics and transmission factor characteristics.

FIG. 6 is a schematic diagram showing characteristics in one cycle of the straight direction (between the ports X0, Y0 and between the ports X1, Y1) and the cross direction (between the ports X0, Y1 and between the ports X1, Y0). In FIG. 6, the horizontal axis expresses wavelength, and the vertical axis expresses chromatic dispersion and transmission factor. The transmission characteristics of the transfer functions H1 and H1* are equal each other and the transmission characteristics of the transfer functions H2 and H2* are equal each other. However, the chromatic dispersion characteristics of the transfer functions H1 and H1* vary reversely from each other relative to a wavelength, and the chromatic dispersion characteristics of the transfer functions H2 and H2* vary reversely from each other relative to a wavelength. In other words, when the chromatic dispersion characteristics of the transfer functions H1 and H1* are multiplied, a constant value which does not depend on the wavelength is obtained, and similarly, when the chromatic dispersion characteristics of the transfer functions H2 and H2* are multiplied, a constant value which does not depend on the wavelength is obtained. Since the interleaved optical filter satisfies the principle of reciprocity, its transfer function basically does not depend on the propagation direction of the light.

Although it is possible to obtain the steep loss wavelength characteristics, namely the chromatic dispersion characteristics having little crosstalk by increasing the number of the stages of Mach-Zehnder interferometer, it is difficult to produce such an optical filter and also there is a problem that the element length is increased.

Furthermore, because the chromatic dispersion that each wavelength receives is not even, a dispersion compensating element must be newly installed to equalize the chromatic dispersion for each wavelength.

When two interleaved optical multiplexing/demultiplexing elements are connected in serial so that the optical signal propagates passing through both straight and cross connections, it is theoretically possible to flatten the chromatic dispersion characteristics (See H. Arai et al., "Reduction of Chromatic Dispersion of Wavelength Interleaver using three-stage MZIs", Proceedings of The 2000 Electronics Society Conference, C-3-15, JAPAN, 2000). However, it is difficult to produce two interleaved optical multiplexing/demultiplexing elements having the identical transmission characteristics, and thus chromatic dispersion depending on a wavelength still remains in a practical situation.

SUMMARY OF THE INVENTION

It is therefore an object of the present invention to provide an optical multiplexer and demultiplexer having flat chromatic dispersion characteristics.

An optical multiplexer according to the invention consists of an interleaved optical filter having first and second port pairs, a connector to connect between the two ports composing the second port pair of the interleaved optical filter, a first optical circulator having first, second and third ports to output an input light of the first port from the second port and output an input light of the second port from the third port, a second optical circulator having first, second and third ports to output an input light of the first port from the second port and output an input light of the second port from the third port, and a combiner to combine the output light from the third port of the first optical circulator and the output light from the third port of the second optical circulator.

The second port of the first optical circulator connects to one of the two ports composing the first port pair of the interleaved optical filter, and a first signal light enters the first port of the first optical circulator. The second port of the second optical circulator connects to the other port of the two ports composing the first port pair of the interleaved optical filter, and a second optical signal enters the first port of the second optical circulator.

Also, the optical multiplexer according to the invention further comprising an optical filter having first and second port pairs, a connector to connect between the two ports composing the second port pair of the optical filter, a first optical circulator having first, second and third ports to output an input light of the first port from the second port and output an input light of the second port from the third port, a second optical circulator having first, second and third ports to output an input light of the first port from the second port and output an input light of the second port from the third port, and a combiner to combine the output light from the third port of the first optical circulator and the output light from the third port of the second optical circulator.

The optical filter has the optical transmission characteristics in which the chromatic dispersion characteristics of two transfer functions in straight direction between the first and second port pairs are in the opposite relation from each other relative to a wavelength and the chromatic dispersion characteristics of two transfer functions in cross direction between the first and second port pairs are also in the opposite relation from each other relative to a wavelength, and transmission wavelengths which differ according to the straight and cross propagation between the first and second port pairs.

The second port of the first optical circulator connects to one of the two ports composing the first port pair of the optical filter, and a first optical signal enters the first port. The second port of the second optical circulator connects to the other port of the two ports composing the first port pair, and a second optical signal enters the first port.

An optical demultiplexer according to the invention consists of an optical divider to divide an input light into two portions, an interleaved optical filter having first and second port pairs, an optical isolator to connect between the two ports composing the second port pair of the interleaved optical filter so that it allows optical propagation from one port to the other and refuses the optical propagation in the opposite direction, a first optical circulator having first, second and third ports to output an input light of the first port from the second port and output an input light of the second port from the third port, and a second optical circulator having first, second and third ports to output an input light of the first port from the second port and output of the second port from the third port.

The second port of the first optical circulator connects one of the two ports composing the first port pair of the interleaved optical filter, and one portion of the divided light by the optical divider enters the first port. The second port of the second optical circulator connects to the other port of the two ports composing the first port pair of the interleaved optical filter, and the other portion of the divided light by the optical divider enters the first port.

Also, the optical demultiplexer according to the invention consists of an optical divider to divide an input light into two portions, an optical filter having first and second port pairs, an optical isolator to connect between the two ports composing the second port pair of the optical filter so that it allows optical propagation from one port to the other and refuses the optical propagation in the opposite direction, a first optical circulator having first, second and third ports to output an input light of the first port from the second port and output an input light of the second port from the third port and a second optical circulator having first, second and third ports to output an input light of the first port from the second port and output an input light of the second port from the third port.

The optical filter has the optical transmission characteristics in which the chromatic dispersion characteristics of two transfer functions in straight direction between the first and second port pairs are in the opposite relation from each other relative to a wavelength and the chromatic dispersion characteristics of two transfer functions in cross direction between the first and second port pairs are also in the opposite relation from each other relative to a wavelength, and transmission wavelengths which differ according to the straight or cross propagation at the propagation between the first and second port pairs.

The second port of the first optical circulator connects to one of the two ports composing the first port pair of the optical filter, and one portion of the divided lights by the optical divider enters the first port. The second port of the second optical circulator connects to the other port of the two ports composing the first port pair of the optical filter, and the other portion of the divided lights by the optical divider enters the first port.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
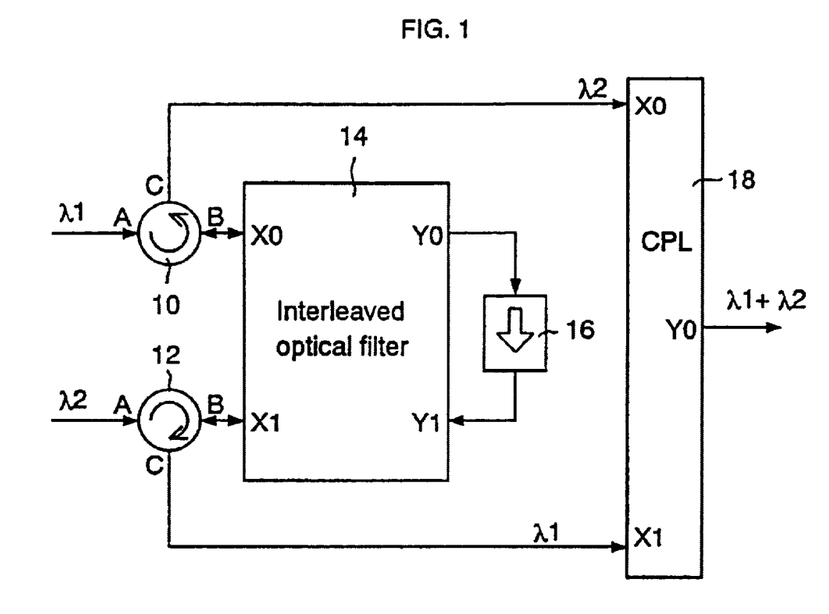
FIG. 1 shows a schematic block diagram of an embodiment of an optical multiplexer according to the invention.

FIG. 1 shows a schematic block diagram of an embodiment of an optical multiplexer according to the invention.

An optical signal having wavelength $\lambda 1$ enters a port A of an optical circulator 10, and an optical signal having wavelength $\lambda 2$ enters a port A of an optical circulator 12. A port B of the optical circulator 10 connects to a port X0 of an interleaved optical filter 14, and a port B of the optical circulator 12 connects to a port X1 of the interleaved optical filter 14. A port Y0 of the optical filter 14 connects to a port Y1 of the optical filter 14 through an optical isolator 16. The optical isolator 16 allows the optical propagation from the port Y0 to the port Y1 of the optical filter 14 and refuses the optical propagation from the port Y1 to the port Y0. Ports Cs of the optical circulators 10 and 12 connect to ports X0 and X1 of a 2×1 optical coupler 18 respectively. The optical coupler 18 combines the lights that enter the input ports X0 and X1 from the ports Cs of the optical circulators 10 and 12 and outputs the combined light from an output port Y0.

A polarizing beam splitter can be also utilized instead of the optical coupler 18. When a polarizing beam splitter is used, the optical circulators 10 and 12, the interleaved optical filter 14 and the optical isolator 16 are required to be polarization preserving type. In addition, the optical fibers to connect the polarizing beam splitter used as a substitute of the optical coupler 18 with the above-mentioned other components should be polarization preserving type.

The optical filter 14 is designed to transmit the optical signal of wavelength $\lambda 1$ through the straight propagation between the ports X0 and Y0 and between the ports X1 and Y1 and to transmit the optical signal of wavelength λ2 through the cross propagation between the ports X0 and Y1 and between the ports X1 and Y0.

The embodiment shown in FIG. 1 multiplexes the optical signals of wavelengths λ1 and λ2. First, the flow of an optical signal of wavelength λ1 is explained. The optical signal having wavelength λ1 enters the port X0 of the optical filter 14 through the ports A and B of the optical circulator 10. Owing to the above-described propagation characteristics of the optical filter 14, the optical signal of wavelength λ1 entered the port X0 propagates to the port Y0 at the transfer function λ1 and enters the port Y1 from the port Y0 through the optical isolator 16. The optical signal having wavelength λ1 entered the port Y1 propagates to the port X1 at the transfer function H1* and enters the port B of the optical circulator 12. Since the optical circulator 12 outputs the input light of the port B from the port C, the optical signal of wavelength λ1 output from the port X1 of the optical filter 14 finally enters the port X1 of the optical coupler 18 and outputs from the output port Y0 of the optical coupler 18.

The flow of the optical signal having wavelength λ2 is explained below. The optical signal of wavelength λ2 enters the port X1 of the optical filter 14 through the ports A and B of the optical circulator 12. Owing to the above-described propagation characteristics of the optical filter 14, the optical signal of wavelength λ2 entered the port X1 propagates to the port Y0 at the transfer function H2* and enters the port Y1 from the port X0 through the optical isolator 16. The optical signal of wavelength λ2 entered the port Y1 propagates to the port X0 at the transfer function H2 and enters the port B of the optical circulator 10. Since the optical circulator 10 outputs the input light of the port B from the port C, the optical signal of wavelength λ2 output from the port X0 of the optical filter 14 finally enters the port X0 of the optical coupler 18 and outputs from the output port Y0 of the optical coupler 18.

The optical signal of wavelength λ1 propagates at the transfer function Hi between the ports X0 and Y0 of the optical filter 14 and the transfer function H1* between the ports Y1 and X1 of the optical filter 14, and therefore the total transfer function of the optical signal of wavelength λ1 is equal to H1×H1*. As already explained, the chromatic dispersion characteristics of H1×H1* is a constant value which does not depend on a wavelength. Accordingly, even if the wavelength λ1 fluctuates or varies, the chromatic dispersion to be received is fixed as far as it is within the transmission wavelength range of the straight direction of the optical filter 14.

Similarly, the optical signal of wavelength λ2 propagates at the transfer function H2* between the ports X1 and Y0 of the optical filter 14 and the transfer function H2 between the ports Y1 and X0 of the optical filter 14, and therefore the total transfer function is equal to H2*×H2. As already explained, the chromatic dispersion characteristics of H2*×H2 is a constant value which does not depend on a wavelength. Accordingly, even if the wavelength λ2 fluctuates or varies, the chromatic dispersion to be received is fixed as far as it is within the transmission wavelength range of the cross direction of the optical filter 14.

Even if the optical signal of wavelength λ1 is reflected when it enters the port Y1 of the optical filter 14, it outputs from the port X1, or it enters the port B of the optical isolator 12, the optical isolator 16 prevents the reflected lights from entering the port Y0 of the optical filter 14. Similarly, the optical isolator 16 prevents reflected lights of wavelength λ2 from entering the optical coupler 18. When the influence of the reflection is negligible, it is possible to omit the optical isolator 16 and connect the ports Y0 and Y1 of the optical filter 14 directly.

As explained above, according to the embodiment, an optical multiplex having a constant chromatic dispersion value which does not depend on a wavelength can be realized. In particular, this is very advantageous for a wavelength division multiplexing optical transmission system. When a plurality of optical signals which can transmit the optical filter 14 in the straight direction are input to the port A of the optical circulator 10 and a plurality of optical signals which can transmit the optical filter 14 in the cross direction are input to the port A of the optical circulator 12, the optical signals of all the wavelengths can be output from the output port Y0 of the optical coupler 18. That is, it is possible to make a single channel by combining the channel composed of the plurality of optical signals of odd wavelengths and the channel composed of the plurality of optical signals of even wavelengths.

Since the optical signal transmits back-and-forth through the optical filter 14, the transmission characteristics relative to the wavelength becomes steeper proportional to the number of the back-and-forth, and thus the crosstalk between the wavelengths is reduced. Since the optical filter 14 has the periodical transmission characteristics relative to a wavelength, it is easy to generate single sideband or residual sideband optical signals at a time, and therefore optical pulses without chirps can be generated. Needless to say, it is also possible to generate optical pulses without chirps when it is applied to a standard double sideband optical signal.

Figure 2:
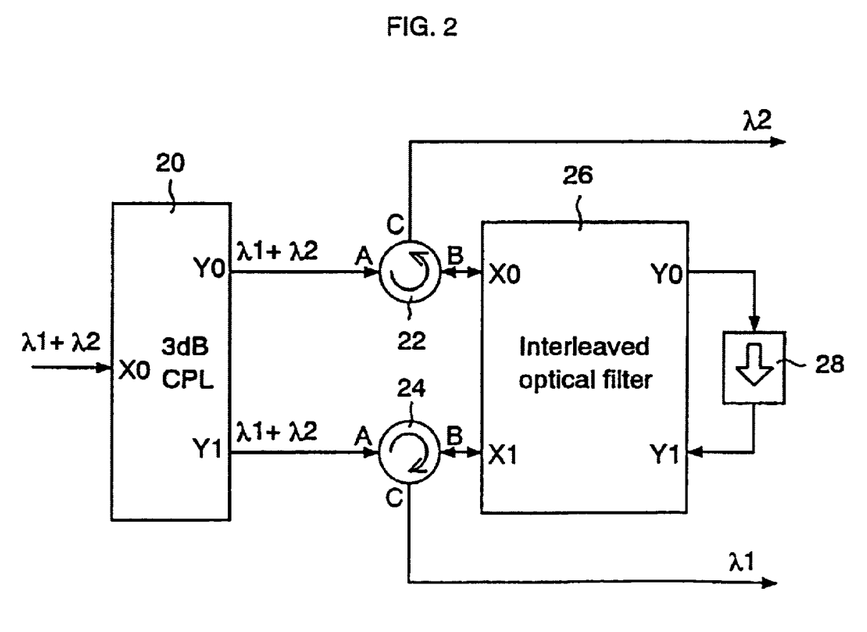
FIG. 2 shows a schematic block diagram of an embodiment of an optical demultiplexer according to the invention.

FIG. 2 shows a schematic block diagram of an optical demultiplexer according to the invention. This embodiment, conversely to the embodiment in FIG. 1, demultiplexes wavelength multiplexed optical signals of a single channel into two channels.

An optical signal of wavelength λ1 and an optical signal of wavelength λ2 are wavelength-multiplexed and enter an input port X0 of a 3 dB optical coupler 20. The optical coupler 20 divides the input light into two portions and applies one portion to a port A of an optical circulator 22 from the output port Y0 and the other portion to a port A of an optical circulator 24 from an output port Y1. A port B of an optical circulator 22 connects to a port X0 of an interleaved optical filter 26, and a port B of an optical circulator 24 connects to a port X1 of the interleaved optical filter 26. A port Y0 of the optical filter 26 connects to a port Y1 of the optical filter 26 through an optical isolator 28. The optical isolator 28 allows the optical propagation from the port Y0 to the port Y1 of the optical filter 26 and refuses the optical propagation from the port Y1 to the port Y0 of the optical filter 26. Although the details are explained later, the demultiplexed optical signal of wavelength λ2 is output from a port C of the optical circulator 22, and the demultiplexed optical signal of wavelength λ1 is output from a port C of the optical circulator 24.

The optical filter 26, similarly to the optical filter 14, is designed to transmit the wavelength λ1 in the straight direction between the ports X0 and Y0 and between the ports X1 and Y1 and transmit the wavelength λ2 in the cross direction between the ports X0 and Y1 and between the ports X1 and Y0.

The embodiment shown in FIG. 2 demultiplexes the wavelength multiplexed light of the wavelengths λ1 and λ2 into the optical signal of wavelength λ1 and the optical signal of wavelength λ2. The 3 dB optical coupler 20 divides the multiplexed light of wavelengths λ1 and λ2 into two portions and applies one portion to the port A of the optical circulator 22 from the output port Y0 and the other portion to the port A of the optical circulator 24 from the output port Y1. Each of the optical circulators 22 and 24 transmits the input light of the port A to the port B and applies to the ports X0 and X1 of the optical filter 26 respectively.

In the lights input the port X0 of the optical filter 26, the optical signal having wavelength λ1 arrives at the port Y0 at the transfer function H1 and the optical signal having wavelength λ2 arrives the port Y1 at the transfer function H2. The optical signal having the wavelength λ1 arrives at the port Y1 from the port Y0 through the optical isolator 28 and arrives at the port X1 of the optical filter 26 after propagating in the straight direction in the optical filter 26 at the transfer function H1*. On the other hand, the optical signal having wavelength λ2 enters the optical isolator 28 from the port Y1 in the opposite direction and therefore it cannot arrive at the port Y0. That is, it is only the optical signal having the wavelength λ1 among the lights input to the port X0 of the optical filter 26 from the outside that can propagate toward the port B of the optical circulator 24 from the port X1 of the optical filter 26. Since the optical circulator 24 outputs the input light of the port B from the port C, the optical signal having wavelength λ1 is separated and output from the port C of the optical circulator 24. The total transfer function of the optical signal having wavelength λ1 at the optical filter 26 is expressed as H1×H1*, and thus its chromatic dispersion characteristics becomes a constant value which does not depend on the wavelength similarly to the case of FIG. 1.

In the lights input the port X1 of the optical filter 26, the optical signal having wavelength λ1 arrives at the port Y1 at the transfer function H1* and the optical signal having wavelength λ2 arrives the port Y0 at the transfer function H2*. The optical signal having the wavelength λ2 arrives at the port Y1 from the port Y0 through the optical isolator 28 and arrives at the port X0 of the optical filter 26 after propagating in the cross direction in the optical filter 26 at the transfer function H2. On the other hand, the optical signal having wavelength λ1 enters the optical isolator 28 from the port Y1 in the opposite direction and therefore it cannot arrive at the port Y0. That is, it is only the optical signal having the wavelength λ2 among the lights input to the port X1 of the optical filter 26 from the outside that can propagate toward the port B of the optical circulator 22 from the port X0 of the optical filter 26. Since the optical circulator 22 outputs the input light of the port B from the port C, the optical signal having wavelength λ2 is separated and output from the port C of the optical circulator 22. The total transfer function of the optical signal having wavelength λ2 at the optical filter 26 is expressed as H2×H2*, and thus its chromatic dispersion characteristics becomes a constant value which does not depend on the wavelength similarly to the case of FIG. 1.

As explained above, in the embodiment shown in FIG. 2, an optical demultiplex with a constant chromatic dispersion value that does not depend on the wavelength is realized. This is especially useful for wavelength division multiplexing optical transmission systems. Wavelength multiplexed optical signals composed of many wavelengths such as 16 wavelengths or 32 wavelengths can be demultiplexed into two channels that consist of a channel with the optical signals having wavelengths transmittable in the straight direction of the optical filter and a channel with the optical signals having wavelengths transmittable in the cross direction of the optical filter 26. By combining this optical demultiplexer and an arrayed waveguide grating, the dense wavelength multiplexing transmission as dense as 0.4 nm of wavelength interval can be realized.

As the optical signal goes and returns, the transmission characteristics become steeper proportional to the number of the round-trips. Accordingly, the cross talk between the wavelengths reduces, and the demultiplexing performance improves.

As readily understandable from the aforementioned explanation, according to the invention, an optical multiplexer and optical demultiplexer having a constant chromatic dispersion value that does not depend on a wavelength in principle. In addition, since its configuration is very simple, it is produced at low cost. Moreover, it utilizes a wavelength periodic optical filter, and thus it is suitable for wavelength division multiplexing transmission or dense wavelength division multiplexing optical transmission.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical multiplexer comprising:
    an interleaved optical filter having a first port pair and a second port pair each port pair having a number one port and a number two port;
    a connector for connecting the number one port and the number two port of the second port pair of the interleaved optical filter;
    a first optical circulator having a first port, a second port, and a third port to output an input light of the first port from the second port and outputs an input light of the second port from the third port wherein the second port connects to the number one port of the first port pair of the interleaved optical filter and a first optical signal enters the first port of the first optical circulator;
    a second optical circulator having a first port, a second port, and a third port to output an input light of the first port from the second port and output an input light of the second port from the third port wherein the second port connects the first port pair of the interleaved optical filter and a second optical signal enters the first port of the second optical circulator; and
    a combiner to combine the output light from the third port of the first optical circulator and the output light from the third port of the second optical circulator.

2. The optical multiplexer of claim 1 wherein the connector comprises an optical isolator to allow optical propagation from the number one port of the second port pair of the interleaved optical filter to the number two port of the second port pair of the interleaved optical filter and reject optical propagation from reverse direction.

3. The optical multiplexer of claim 1 wherein the interleaved optical filter comprises optical transfer characteristics in which chromatic dispersion characteristics of two transfer functions in straight direction between the first and second port pairs are in opposite relation from each other relative to a wavelength and the chromatic dispersion characteristics of two transfer functions in cross direction between the first and second port pairs are in opposite relation from each other relative to a wavelength.

4. The optical multiplexer of claim 1 wherein the interleaved optical filter comprises transmission wavelengths in straight and cross propagations between the first and second port pairs and those transmission wavelengths are different from each other.

5. An optical multiplexer comprising:
an optical filter having first and second port pairs, optical transfer characteristics in which chromatic dispersion characteristics of two transfer functions in straight direction between the first and second port pairs are in the opposite relation from each other relative to a wavelength and chromatic dispersion characteristics of two transfer functions in cross direction between the first and second port pairs are in the opposite relation from each other relative to a wavelength, and transmission wavelengths which differ according to straight and cross propagation between the first and second port pairs;
a connector to connect between two ports composing the second port pair of the optical filter;
a first optical circulator having first, second and third ports to output an input light of the first port from the second port and output an input light of the second port from the third port wherein the second port connects to one of the two ports composing the first port pair of the optical filter and a first optical signal enters the first port;
a second optical circulator having first, second and third ports to output an input light of the first port from the second port and output an input light of the second port from the third port wherein the second port connects the other one of the two ports composing the first port pair of the optical filter and a second optical signal enters the first port; and
a combiner to combine the output light from the third port of the first optical circulator and the output light from the third port of the second optical circulator.

6. The optical multiplexer of claim 5 wherein the connector comprises an optical isolator to allow optical propagation from one of the two ports composing the second port pair of the optical filter to the other of the two ports composing the second port pair of the optical filter and refuse optical propagation in opposite direction from the direction of the allowed optical propagation.

7. The optical multiplexer of claim 5 wherein the optical filter comprises periodic transmission characteristics relative to a wavelength.

8. An optical demultiplexer comprising:
an optical divider to divide an input light into a first portion and a second portion;
an interleaved optical filter having a first port pair and a second port pair;
an optical isolator connecting two ports composing the second port pair of the interleaved optical filter to allow optical propagation from one of the two ports to the other and refuse optical propagation in the opposite direction of the allowed optical propagation;
a first optical circulator having first, second and third ports to output an input light of the first port from the second port and output an input light of the second port from the third port wherein the second port connects one of the two ports composing the first port pair of the interleaved optical filter and first portion of the divided lights by the optical divider enters the first port of the first optical circulator; and a second optical circulator having first, second and third ports to output an input light of the first port from the second port and output an input light of the second port from the third port wherein the second port connects the other port of the two ports composing the first port pair of the interleaved optical filter and the second portion of the divided lights by the optical divider enters the first port of the second optical circulator.

9. The optical demultiplexer of claim 8 wherein the interleaved optical filter comprises optical transfer characteristics in which chromatic dispersion characteristics of two transfer functions in straight direction between the first and second port pairs are in opposite relation from each other relative to a wavelength and chromatic dispersion characteristics of two transfer functions in cross direction between the first and second port pairs are in opposite relation from each other relative to a wavelength.

10. The optical demultiplexer of claim 8 wherein the interleaved optical filter comprises transmission wavelengths of the straight and cross propagations between the first and second port pairs and the two transmission wavelengths are different from each other.

11. An optical demultiplexer comprising:
an optical divider to divide an input light into a first portion and a second portion;
an optical filter having first and second port pairs, optical transfer characteristics in which chromatic dispersion characteristics of two transfer functions in straight direction between the first and second port pairs are in opposite relation from each other relative to a wavelength and chromatic dispersion characteristics of two transfer functions in cross direction between the first and second port pairs are in opposite relation from each other relative to a wavelength, and transmission wavelengths that differ according to the straight and cross propagation between the first port pair and the second port pair,
an optical isolator connecting between two ports composing the second port pair of the optical filter to allow optical propagation from one port to the other port of the two ports and refuse optical propagation from the direction of the allowed optical propagation in the opposite direction; and
a first optical circulator having first, second and third ports to output an input light of the first port from the second port and output an input light of the second port from the third port wherein the second port connects to one of two ports composing the first port pair of the optical filter and the first portion of the divided lights from the optical divider enters the first port of the first optical circulator; and
a second optical circulator having first, second and third ports to output an input light of the first port from the second port and output an input light of the second port from the third port wherein the second port connects to the other one of the two ports composing the first port pair of the optical filter and the second portion of the divided lights from the optical divider enters the first port of the second optical circulator.

12. The optical demultiplexer of claim 11 wherein the optical filter comprises periodic transmission characteristics relative to a wavelength.

* * * * *